April 25, 1950     C. H. JACOBSON     2,505,329

FILM CORE RETAINING AND DRIVING DEVICE

Filed June 28, 1947

INVENTOR
Carl H. Jacobson
BY
ATTORNEY

Patented Apr. 25, 1950

2,505,329

UNITED STATES PATENT OFFICE 2,505,329

FILM CORE RETAINING AND DRIVING DEVICE

Carl H. Jacobson, Binghamton, N. Y., assignor to General Aniline & Film Corporation, New York, N. Y., a corporation of Delaware Application June 28, 1947, Serial No. 757,719

5 Claims. (Cl. 242—46.2)

This invention pertains to improvements in photographic apparatus, and more specifically, to improved means for driving a film roll-holding core or spool and for permitting ready attachment and detachment thereof.

Among the objects of the invention is that of providing an interconnecting means between a film core and its driving spindle which permits the core to be quickly attached and detached, but which shall function, when assembled, to rotate the core either positively or frictionally as the case may be.

It is another object of the invention to devise a mechanism of simple construction, which may be cheaply manufactured and which shall be positive in its action and effective for the purpose described. Other objects will be apparent from the following disclosure.

In moving picture apparatus, e. g. cameras, projectors or magazines for cameras, film is reeled on cores either of metal or plastic, and these cores must be quickly inserted and removed. The core on which film is taken up or wound must be driven, preferably by frictional engagement, so that its speed of rotation may vary in accordance with the amount of film available for being wound or taken up. These requirements call for some interconnection between the core and a driving spindle or other driving means, which will serve the dual function of permitting ready attachment and removal and of imparting torque to the core. In most of the prior art, the friction drive means is a part of the mechanism upon which the core is supported and by which it is frictionally retained. According to the present invention, the core itself has attached thereto a coil of spring wire or equivalent which may or may not be positively fixed to the core, depending upon whether or not the drive means is to be frictional to compensate for different diameters of film roll, as is customary in most take-up mechanisms. This spring wire is shaped in such a manner that at the center of the core and in position to engage a driving spindle, it is helically formed to be received upon a threaded end of the drive means.

The invention will be described in greater detail by reference to the accompanying figures of drawing, in which identical reference numerals refer to like parts. In the figures.

Figure 1:
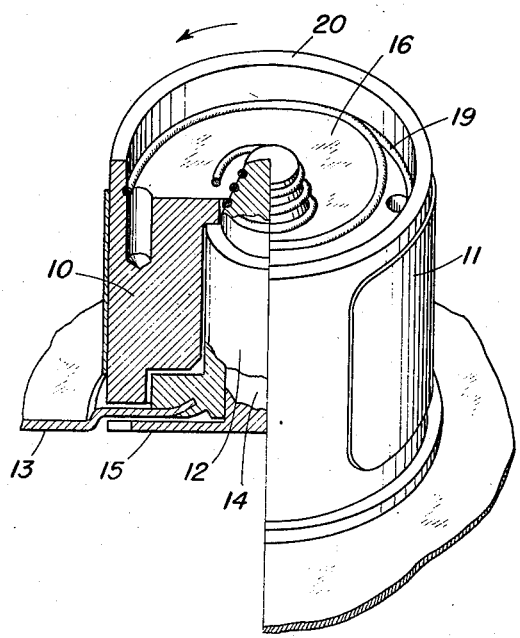
Fig. 1 is a perspective view of a film core and a driving means therefor to which the invention has been applied, part of the device having been broken away to be shown in section.
Figure 2:
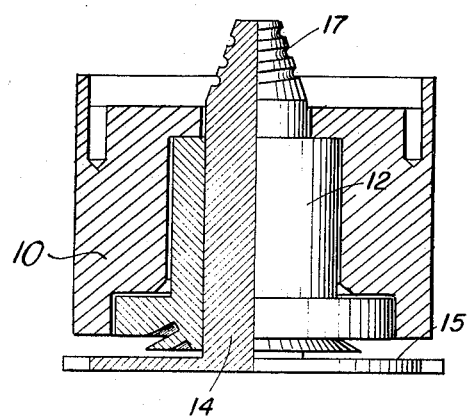
Fig. 2 is a partial section of the core supporting sleeve and the driving core and spindle.

Now, referring to the figures, the invention has been illustrated as it is applied to a typical moving picture apparatus, although it is to be understood that a preferred form only is illustrated and that the device may be applied to other moving picture mechanisms and may take different specific forms without departing from the original concept. Core 10 of either metal or plastic, is of more or less conventional construction generally and has the usual film-retaining clip 11. This core is freely rotatable upon a supporting sleeve 12, which is permanently or otherwise attached to a wall member 13 which may be one wall of a film magazine or may be part of the casing structure of a camera or projector. For driving or rotating the core, a central spindle 14 projects through the sleeve 12 and has either as an integral part thereof or attached as a separate piece, a drive gear 15 which may be rotated by interconnection to any conventional power mechanism, such as an electric motor or spring motor to be found in motion picture apparatus of this type.

The drive spindle 14 projects beyond the sleeve 12 and also beyond the face 16 of the film core and terminates in a threaded end 17. This threaded end may be tapered, as illustrated, or may be of cylindrical form, although the tapered construction is preferred since it facilitates engagement of the parts when the core is placed on the sleeve.

Figure 3:
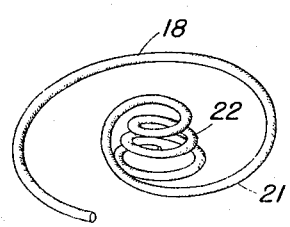
Fig. 3 is a perspective view of the interconnecting wire driving member.

As shown in Figs. 1 and 3, a wire or other interconnecting drive member has a portion 18 which is insertable in a groove 19 cut at the base of flange 20 in the core. The part 18 of the wire coil member is practically circular in form and extends for slightly more than 180°, so that it functions as a snap wire in the groove and thus may be quickly attached or detached. The wire is then coiled inwardly toward the center at 21 and terminates in a helical portion 22 which may be tapering, as illustrated, to be threaded onto the part 17 of the drive spindle, or may be of other shape, depending upon the said threaded part of the spindle. While any convenient number of threads and coils may be employed, it has been found in practice that three turns of the wire in combination with the slight tapering provides for easy and positive engagement of the parts and yet serves very effectively for driving the core, once the parts have been assembled.

The direction of the threads 17 and of the coil 22 is such that when the spindle 14 is rotated in the driving direction, the threaded engagement will tend to become more tightened. To disassemble the parts it is only necessary to rotate the core in the opposite direction for three turns more or less, depending upon the number of threads 17, and it may be readily detached. If the tapering is pronounced, fewer turns are necessary for effecting engagement and disengagement.

The frictional contact between the part of the wire 18 and the groove 19 is regulated to impart the requisite torsional force for winding film on the core. As is commonly practiced in most take-up drives, the spindle 14 always rotates much faster than the core at the start of winding and slightly faster than the core when the latter has been filled. In some instances, it may be desired to drive positively and in that event, the spring wire may be fixed to the core by soldering in the event the parts are of metal, or may be so formed as to engage a part of the core in such a manner that it cannot be rotated relatively thereto.

While the interconnecting driving means has specifically been referred to as a spring wire, it is to be understood that other equivalents are contemplated and that flexibility is not necessary in all instances. Something other than wire may be employed, if desired. The actual form of the core may be varied within wide limits and the term core is to be understood as being generic to all types of film roll-holding apparatus, for example, reels or other flanged members commonly employed for winding film.

While one preferred embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic device having a film core and a supporting member upon which said core is freely rotatable and from which it may be readily detached, means for rotating said core when assembled on said supporting member and for retaining it in position axially thereof, which comprises a driven member threaded at one end and a wire spring member having at one end driving engagement with the core and at its other end being helically coiled to be drivingly engaged upon the threaded end of said driven member upon relative rotation in one direction and to be disengaged therefrom upon rotation in the opposite direction.

2. In a photographic device having a film core and a supporting member upon which said core is freely rotatable and from which it may be readily detached, means for rotating said core when assembled on said supporting member and for retaining it in position axially thereof, which comprises a driven spindle carried within and extending beyond said supporting member, that end which extends beyond the supporting member being threaded, and an interconnecting and torque transmitting member helically coiled at one end for engagement with the threaded end of the spindle and frictionally attached at its other end to the core.

3. In a photographic device having a film core and a supporting member upon which said core is freely rotatable and from which it may be readily detached, means for rotating said core when assembled on said supporting member and for retaining it in position axially thereof, which comprises a driven spindle carried within and extending beyond said supporting member, that end which extends beyond the supporting member being tapered and threaded, and an interconnecting and torque transmitting wire member helically coiled at one end to engage the threaded end of the spindle and having a snap ring connection with the core at its other end.

4. In a photographic device having a film core and a supporting member upon which said core is freely rotatable and from which it may be readily detached, means for rotating said core when assembled on said supporting member and for retaining it in position axially thereof, which comprises a driven spindle carried within and extending beyond said supporting member, that end which extends beyond the supporting member being tapered and threaded, and an interconnecting and torque transmitting wire member helically coiled at one end to engage the threaded end of the spindle and at its other end having a concentric portion extending circumferentially for more than 180° for engagement within a groove in the core, said concentric portion being curved to a radius greater than that of the core to provide snap engagement and frictional driving contact between the parts.

5. In a photographic device having a film core and a relatively fixed sleeve upon which said core is freely rotatable and from which it may be readily detached, a driven spindle guided within and having a tapered, threaded end projecting beyond said sleeve, and interconnecting torque transmitting means between said spindle and core which comprises a spring wire member having a tapered, helically coiled end for engagement upon the threaded end of the spindle and at its other end having a concentric portion extending circumferentially for more than 180° for engagement within a groove in the core, said concentric portion being curved to a radius greater than that of the core to provide snap engagement and frictional driving contact between the parts.

CARL H. JACOBSON.

REFERENCES CITED

The following references are of record in the file of this patent:

UNITED STATES PATENTS

| Number | Name | Date |
| --- | --- | --- |
| 1,111,506 | Tessier | Sept. 22, 1914 |
| 2,424,697 | Lear | July 29, 1947 |

FOREIGN PATENTS

| Number | Country | Date |
| --- | --- | --- |
| 546,256 | Germany | Mar. 11, 1932 |